(12) United States Patent
Yang et al.

(10) Patent No.: US 10,254,433 B2
(45) Date of Patent: Apr. 9, 2019

(54) NUCLEAR MAGNETIC RESONANCE (NMR) LOGGING TOOL CALIBRATION

(71) Applicant: HALLIBURTON ENERGY SERVICES, INC., Houston, TX (US)

(72) Inventors: Jie Yang, Exton, PA (US); Rebecca Corina Jachmann, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 425 days.

(21) Appl. No.: 14/904,049

(22) PCT Filed: Jul. 15, 2013

(86) PCT No.: PCT/US2013/050476
§ 371 (c)(1),
(2) Date: Jan. 8, 2016

(87) PCT Pub. No.: WO2015/009274
PCT Pub. Date: Jan. 22, 2015

(65) Prior Publication Data
US 2016/0170071 A1 Jun. 16, 2016

(51) Int. Cl.
*G01V 3/00* (2006.01)
*G01V 3/32* (2006.01)
*G01V 13/00* (2006.01)

(52) U.S. Cl.
CPC ............. *G01V 3/32* (2013.01); *G01V 13/00* (2013.01)

(58) Field of Classification Search
CPC .......... G01V 3/32; G01V 3/38; G01N 24/081; G01R 33/448; G01R 33/3808
USPC ........................................................ 324/303
See application file for complete search history.

(56) References Cited

U.S. PATENT DOCUMENTS

| | | | |
|---|---|---|---|
| 5,309,098 A | 5/1994 | Coates et al. |
| 5,451,873 A | 9/1995 | Freedman et al. |
| 6,624,629 B1 | 9/2003 | Speier et al. |
| 6,717,404 B2 | 4/2004 | Prammer |
| 7,023,208 B2 | 4/2006 | Kurimoto et al. |

(Continued)

FOREIGN PATENT DOCUMENTS

| EP | 0523740 | 1/1993 |
|---|---|---|
| WO | 2015/009274 | 1/2015 |

OTHER PUBLICATIONS

PCT International Search Report and Written Opinion, dated Jan. 9, 2014, Appl No. PCT/US2013/050476, "Nuclear Magnetic Resonance (NMR) Logging Tool Calibration," filed Jul. 16, 2013, 12 pgs.

(Continued)

*Primary Examiner* — Walter L Lindsay, Jr.
*Assistant Examiner* — Frederick Wenderoth
(74) *Attorney, Agent, or Firm* — Gilliam IP PLLC

(57) ABSTRACT

A disclosed nuclear magnetic resonance (NMR) logging tool includes a static magnetic field source. The NMR logging tool also includes a pulsed magnetic field source with an operational range corresponding to a predetermined frequency range and a predetermined amplitude range. The NMR logging tool also includes a controller in communication with the pulsed magnetic field source. The controller performs a calibration for the pulsed magnetic field source to optimize an NMR parameter. The calibration uses a reduced search space within the operational range to select a frequency and an amplitude that optimize the NMR parameter.

20 Claims, 5 Drawing Sheets

(56) References Cited

U.S. PATENT DOCUMENTS

| | | | |
|---|---|---|---|
| 2002/0175681 A1 | 11/2002 | Taicher et al. | |
| 2005/0156592 A1* | 7/2005 | Bordon | G01N 24/081 |
| | | | 324/303 |
| 2006/0255799 A1* | 11/2006 | Reiderman | G01N 24/081 |
| | | | 324/303 |
| 2011/0238312 A1* | 9/2011 | Seydoux | G01V 3/22 |
| | | | 702/6 |
| 2011/0282622 A1* | 11/2011 | Canter | G06K 9/00691 |
| | | | 702/150 |
| 2012/0204142 A1* | 8/2012 | Rubenstein | G06F 8/30 |
| | | | 717/101 |
| 2012/0265468 A1* | 10/2012 | Dennis | E21B 47/00 |
| | | | 702/85 |

OTHER PUBLICATIONS

PCT International Preliminary Report on Patentability, dated Aug. 7, 2015, Appl No. PCT/US2013/050476, "Nuclear Magnetic Resonance (NMR) Logging Tool Calibration," filed Jul. 16, 2013, 9 pgs.
Mitchell, J. et al., "A rapid measurement of T1/T2: The DECPMG sequence", Journal of Magnetic Resonance 200 (2009), p. 198-206.
Prammer, M.G. et al., "A New Mutliband Generation of NMR Logging Tools", SPE 49011, Society of Petroleum Engineers, Inc., 1998, 7 pgs.
AU Examination Report, dated Jun. 15, 2016, "Nuclear Magnetic Resonance (NMR) Logging Tool Calibration," Appln. No. 2013394368 filed Jul. 15, 2013, 2 pgs.
Australian Application Serial No. 2017204050; First Exam Report; dated Jun. 12, 2018.
MX Application Serial No. MX/a/2016/000262, Office Action, dated Sep. 12, 2018, 5 pages.

\* cited by examiner

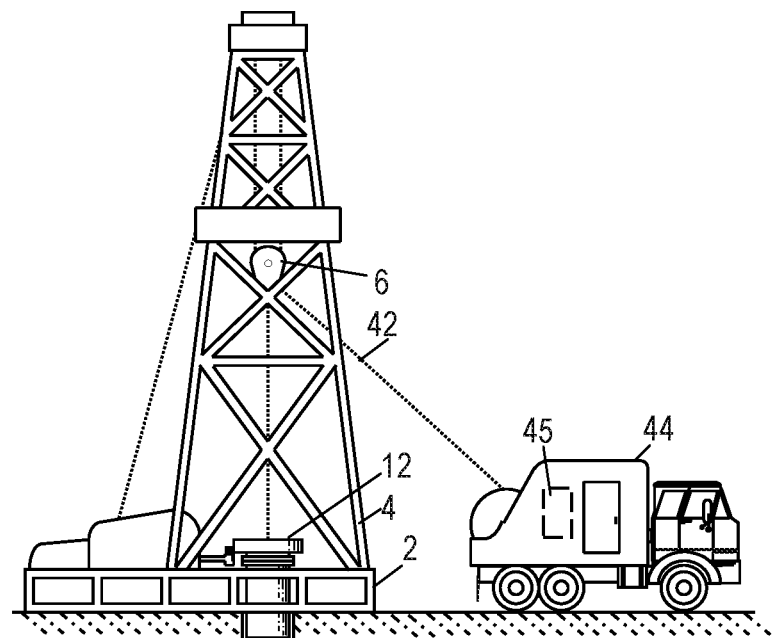
FIG. 5
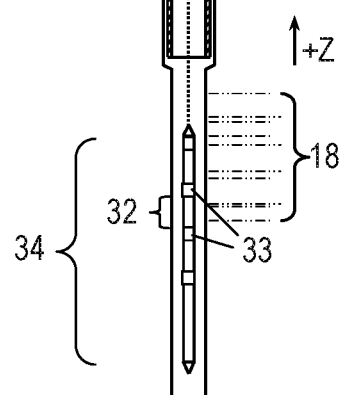
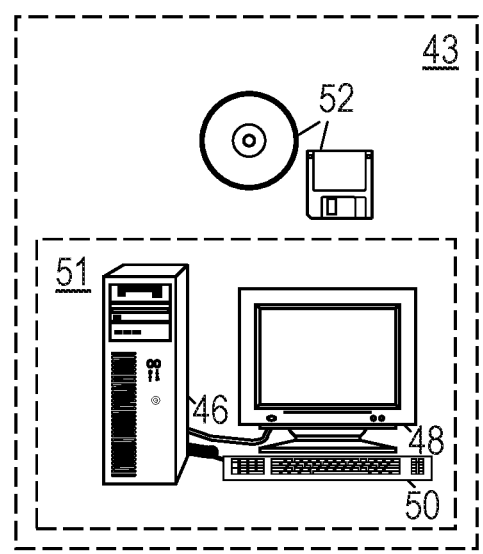
FIG. 6

NUCLEAR MAGNETIC RESONANCE (NMR) LOGGING TOOL CALIBRATION

BACKGROUND

Understanding the structure and properties of geological formations can improve the efficiency of oil field operations such as drilling, well completion, and production. The collection of information relating to conditions downhole, commonly referred to as "logging," can be performed by several methods including nuclear magnetic resonance (NMR) logging.

NMR logging tools operate by using an imposed static magnetic field, $B_0$, to give nuclei with non-zero nuclear spin (non-zero angular momentum) split energy levels. Since lower energy levels are preferred, an ensemble of nuclei will exhibit an anisotropic distribution of energy states, giving the nuclear spins a preferential polarization parallel to the imposed field. This state creates a net magnetic moment, producing a bulk magnetization. The nuclei (primarily hydrogen nuclei) converge upon their equilibrium alignment with a characteristic exponential relaxation time constant. When this convergence occurs after the nuclei have been placed in a cooperative initial state (discussed below), it is known as recovery. The time constant for recovery is called the "spin-lattice" or "longitudinal" relaxation time $T_1$.

During or after the polarization period, the tool applies a perturbing field, usually in the form of a radio frequency electromagnetic pulse whose magnetic component, $B_1$, is perpendicular to the static field, $B_0$. This perturbing field moves the orientation of the magnetization into the transverse (perpendicular) plane. The frequency of the pulse can be chosen to target specific nuclei (e.g., hydrogen). The polarized nuclei are perturbed simultaneously and, when the perturbation ends, they precess around the static magnetic field gradually re-polarizing to align with the static field once again while losing coherence in the transverse plane ($T_2$ relaxation). The precessing nuclei generate a detectable radio frequency signal that can be used to measure statistical distributions of $T_1$, $T_2$, porosities, and/or diffusion constants.

Due to $B_0$ in an ex-situ NMR logging tool being a gradient field there is a range of Larmor frequencies available. Thus, depending on the magnetic field configurations being used in an NMR experiment, controllable $B_1$ parameters (e.g., amplitude, frequency, pulse bandwidth) can improve the signal-to-noise ratio (SNR) of NMR logging measurements. Determining appropriate control parameters for NMR logging operations is not a trivial task. Further, temperature variance, or other dynamic variables, in the downhole environment may necessitate changes to NMR logging control parameters.

BRIEF DESCRIPTION OF THE DRAWINGS

Accordingly, there are disclosed herein various nuclear magnetic resonance (NMR) logging tool systems and methods with efficient calibration to optimize an NMR parameter.

FIG. 5 shows an illustrative wireline logging environment.

FIG. 6 shows an illustrative computer system for managing logging operations.

Figure 1:
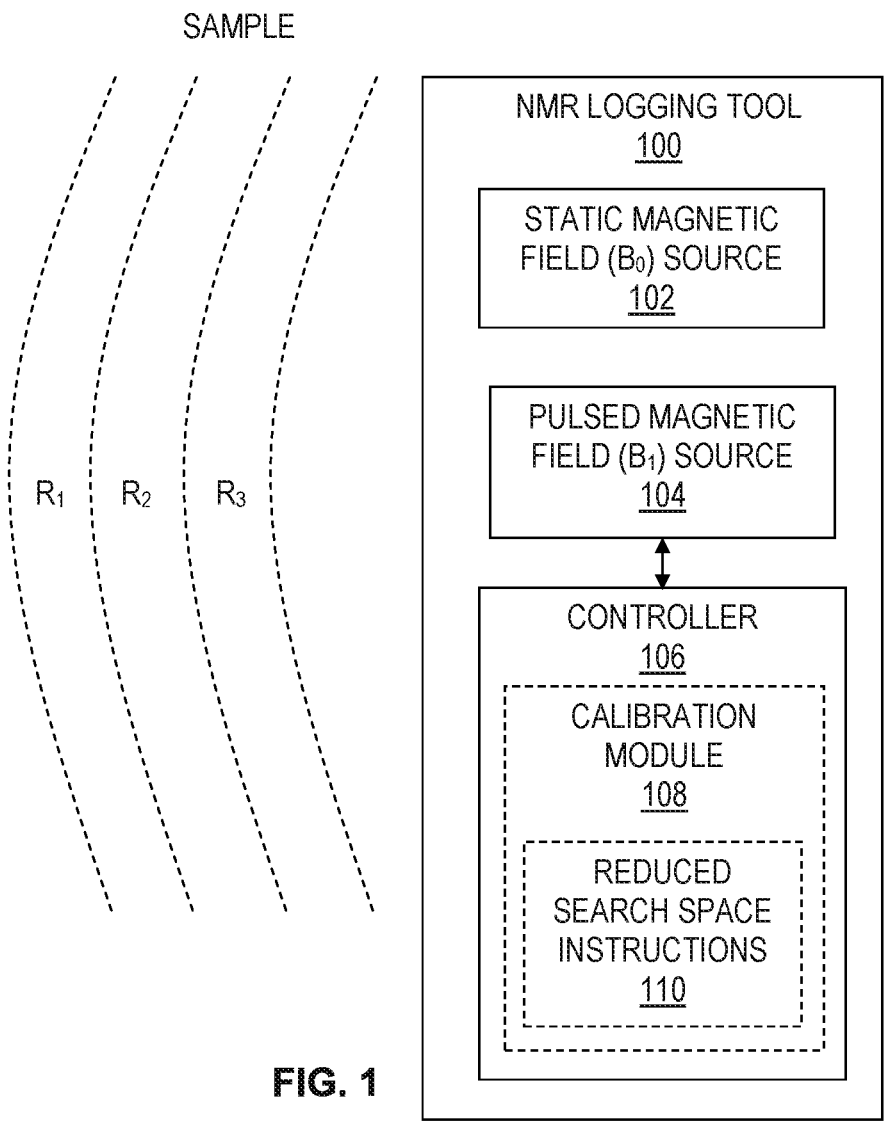
FIG. 1 shows a block diagram of an illustrative NMR logging tool.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents nuclear magnetic resonance (NMR) logging tool systems and methods with efficient calibration to optimize an NMR parameter such as signal-to-noise ratio (SNR). In some embodiments, the calibration is performed for a pulsed magnetic field source with an operational range corresponding to a predetermined frequency range and a predetermined amplitude range. To improve calibration efficiency, a reduced search space within the operational range is determined and is used to select a frequency and an amplitude that optimize the NMR parameter. The calibration techniques described herein are applicable to both $T_1$ and $T_2$ measurements.

FIG. 1 shows a block diagram of an illustrative NMR logging tool 100. As shown, the NMR logging tool 100 includes a static magnetic field ($B_0$) source 102, which may correspond to one or more permanent magnets (e.g., samarium cobalt magnets). The NMR logging tool 100 also includes a pulsed magnetic field ($B_1$) source 104, which may correspond to one or more antennas with suitable electronics to generate pulsed magnetic fields. The pulsed magnetic field source 104 has an operational range corresponding to a predetermined frequency range and a predetermined amplitude range. As an example, the pulsed magnetic field source 104 may have a frequency range of 100 kHz to 1.5 MHz and an amplitude range of 40 amps to 400 amps. The NMR logging tool 100 also includes a controller 106 coupled to the pulsed magnetic field source 104. In some embodiments, the controller 106 includes a processor and a memory with executable instructions. The controller 106 is able to direct the pulsed magnetic field source 104 to output pulses having a particular frequency and amplitude within the operational range of the pulsed magnetic field source 104. As shown, the controller 106 comprises a calibration module 108 that enables the controller 106 to optimize an NMR parameter by calibrating the frequency and amplitude associated with the pulsed magnetic field source 104. The calibration module 108, for example, may be a software module or a programmable hardware component of controller 106. To efficiently perform calibration, the calibration module 108 includes reduced search space instructions 110 that determine a reduced search space within the operational range of the pulsed magnetic field source 104 from which to select a frequency and an amplitude that optimize the NMR parameter.

In an alternative embodiment, the controller 106 corresponds to a control interface that receives instructions or commands from a remote computer, and that directs the pulsed magnetic field source 104 accordingly. In this alternative embodiment, the remote computer stores and executes the calibration module 108, and provides instructions to the controller 106 during the calibration process. To summarize, the controller 106 is able to control switches, power supplies, or other electronics for the pulsed magnetic field source 104 during the calibration process or in response to the calibration process. The controller 106 may perform various processing and analysis operations during the calibration process, or may simply receive commands from a local or remote computer tasked with performing calibration processing and analysis. The decision to perform calibration processing/analysis operations locally or remotely may be based on preference or limitations with regard to the amount of downhole processing, the bandwidth and data rate for data transmissions between the NMR logging tool 100 and a remote computer, the durability of downhole components, or other criteria.

Regardless of whether the calibration module 108 is implemented locally or remotely, in some embodiments, the reduced search space instructions 110 enable the reduced search space to be determined by identifying two points in the operational range that optimize the NMR parameter with respect to one variable, and selecting a two-dimensional line (or representative linear equation) that extends through the two points as the reduced search space. For example, the two points may be identified by performing amplitude scan operations at two different frequencies within the operational range, and identifying a scanned amplitude that optimizes the NMR parameter for each of the two different frequencies. In an alternative embodiment, the two points are identified by performing frequency scan operations at two different amplitudes within the operational range, and identifying a scanned frequency that optimizes the NMR parameter for each of the two different amplitudes. The reduced search space instruction 100 also may rely on a statistical scan algorithm (e.g., Nelder-Mead, Monte Carlo, gradient, genetic) to determine the reduced search space and/or to select a frequency and an amplitude within (or along) the reduced search space that optimize the NMR parameter.

The calibration described herein may be performed at different times. For example, the calibration may be performed before the NMR logging tool 100 is lowered into a downhole environment, while the NMR logging tool 100 is in a downhole environment, and/or after the NMR logging tool 100 is removed from a downhole environment. Further, the calibration may be performed in response to one or more temperature change criteria. For example, if the temperature in a downhole environment changes by more than a threshold amount, the controller 106 may perform the calibration.

Due to $B_0$ in an ex-situ NMR logging tool being a gradient field there is a range of Larmor frequencies available. Thus, depending on the magnetic field configuration used for the NMR logging tool 100, a particular amplitude and frequency for $B_1$ can improve the signal-to-noise (SNR) of NMR logging measurements. The magnetic field configuration (i.e., the static and pulsed magnetic fields) for NMR logging tool 100 is associated with sample regions $R_1$-$R_3$ such that the NMR SNR varies for $R_1$, $R_2$, and $R_3$ Further, the shape and/or volume associated with sample regions $R_1$-$R_3$ vary depending on the magnetic field configuration for the NMR logging tool 100. The magnetic field configuration is affected by factors such as the quantity, orientation, and strength of permanent magnets, and/or the size, orientation, and pulse selection of antennas/transmitters). The frequency and amplitude limits for the transmitters may change depending on the magnetic field. Further, transmitters are currently not built to handle all frequencies from 100 kHz to 1.5 Mhz. Thus, a selected zone between 100 kHz to 1.5 Mhz may be used, depending on the capabilities of the transmitter.

Regardless of the magnetic field configuration for the NMR logging tool 100, the calibration operation performed by calibration module 108 is configured to determine an optimal frequency and amplitude for pulsing $B_1$, using a reduced search space within the operational range of the pulsed magnetic field source 104. In some embodiments, the optimal frequency and amplitude for $B_1$ maximizes NMR SNR in a particular sample region of interest (e.g., region $R_1$, $R_2$, or $R_3$). In alternative embodiments, the optimal frequency and amplitude for $B_1$ maximizes NMR signal amplitude.

Figure 2A:
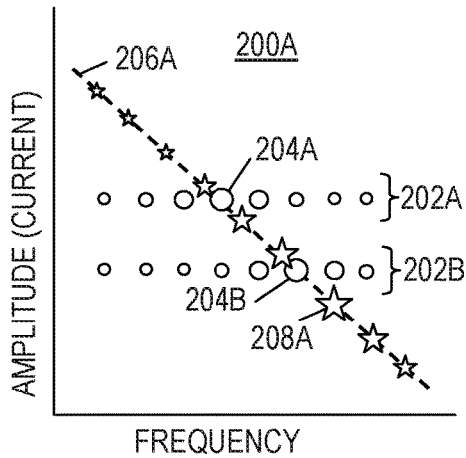
FIGS. 2A-2C show search space illustrations within the operational range of a pulsed magnetic field source.
Figure 2B:
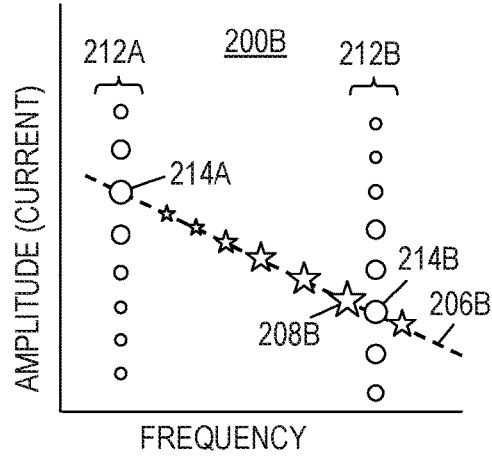
Figure 2C:
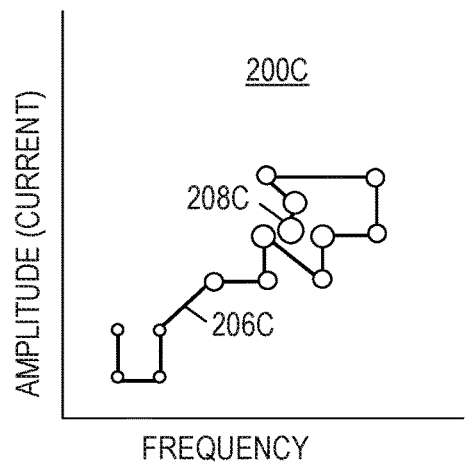

FIGS. 2A-2C show search space illustrations within the operational range of a pulsed magnetic field source, such as the pulsed magnetic field source 104. In FIGS. 2A-2C, the operational range is illustrated as charts 200A-200C, each having an amplitude (current) axis (i.e., the power level/current applied to an antenna of the pulsed magnetic field source 104) and a frequency axis (i.e., the frequency control for the pulsed magnetic field source 104). Although it is possible to search the entire operational range to determine an optimal amplitude and frequency for $B_1$, an exhaustive search is time consuming. It is also possible to perform NMR operations using a sub-optimal amplitude and frequency for $B_1$ (assuming a range of Larmor condition frequencies are available), however, use of a sub-optimal amplitude and frequency for $B_1$ may necessitate additional data sampling or risk uncertain results. Instead of performing an exhaustive search of the operational range or selecting a sub-optimal amplitude and frequency for $B_1$, disclosed embodiments are configured to determine a reduced search space within the operational range that includes the optimal amplitude and frequency for $B_1$. Once the reduced search space has been determined, it is scanned to select the optimal amplitude and frequency for $B_1$. The reduced search space may correspond to one or more lines, curves, shapes, or areas. Determining or searching the reduced search space may also involve statistical algorithms to reduce the number of data points scanned within the operational range to determine the optimal amplitude and frequency for $B_1$.

In charts 200A-200C of FIGS. 2A-2C, various data points are illustrated to visualize the process of determining a reduced search space and/or searching within the reduced search space to select an optimal frequency and amplitude for the pulsed magnetic field source 104. The actual calibration process related to charts 200A-200C is a data processing/analysis algorithm that need not involve the display of data points or other visual identifiers. However, the related data could be stored and used to derive such charts for the benefit of logging operators during or after logging operations.

In chart 200A, the reduced search space 206A corresponds to a line that intersects two constant amplitude scans 202A and 202B, where each constant amplitude scan has multiple amplitude/frequency data points represented by circles. The size of the circles in chart 200A corresponds to an NMR parameter such as SNR (i.e., a larger circle means a higher value for the NMR parameter). More specifically, the reduced search space 206A corresponds to a line that extends between (and through) an optimal data point 204A along constant amplitude scan 202A and an optimal data point 204B along constant amplitude scan 202B. Thus, the reduced search space 206A can be represented as a linear equation.

Once the reduced search space 206A has been determined, scanning is performed along the reduced search space 206A. For example, a corresponding linear equation may be used by the controller 106 to control scan operations along the reduced search space 206A. In chart 200A, the scan along the reduced search space 206A has multiple amplitude/ frequency data points represented by stars, where the size of the stars in chart 200A corresponds to an NMR parameter such as SNR (i.e., a larger star means a higher value for the NMR parameter). The optimal data point 208A in the reduced search space 206A is selected as the frequency and current for the pulsed magnetic field source 104.

In chart 200B, the reduced search space 206B corresponds to a line that intersects two constant frequency scans 212A and 212B, where each constant frequency scan has multiple amplitude/frequency data points represented by circles. The size of the circles in chart 200B corresponds to an NMR parameter such as SNR (i.e., a larger circle means a higher value for the NMR parameter). More specifically, the reduced search space 206B extends between (and through) an optimal data point 214A along constant frequency scan 212A and an optimal data point 214B along constant frequency scan 212B. Thus, the reduced search space 206B can be represented as a linear equation.

Once the reduced search space 206B has been determined, scanning is performed along the reduced search space 206B. In chart 200B, the scan along the reduced search space 206B has multiple amplitude/frequency data points represented by stars, where the size of the stars in chart 200B corresponds to an NMR parameter such as SNR (i.e., a larger star means a higher value for the NMR parameter). The optimal data point 208B in the reduced search space 206B is selected as the frequency and current for the pulsed magnetic field source 104.

In chart 200C, the reduced search space 206C is shown as a line that connects multiple data points represented by circles. The size of the circles in chart 200C corresponds to an NMR parameter such as SNR (i.e., a larger circle means a higher value for the NMR parameter). The reduced search space 206C is a visualization of a statistical "hill-climbing" algorithm scan applied to the operational range to determine the optimal data point 208C without searching every data point. The statistical algorithm scan may employ Nelder-Mead, Monte Carlo, gradient, genetic, or other statistical algorithms to reduce the search space.

In different embodiments, the spacing between collected data points in charts 200A-200C may vary. Further, the number of scans used to determine the reduced search space 206A-2006C may vary. Reduced search spaces may correspond to areas, linear lines, or nonlinear lines within the operational range. The scan operations to determine the reduced search space and/or the scan operations along the reduced search space may follow a linear trajectory as shown in charts 200A-200C, or a nonlinear trajectory.

Figure 3:
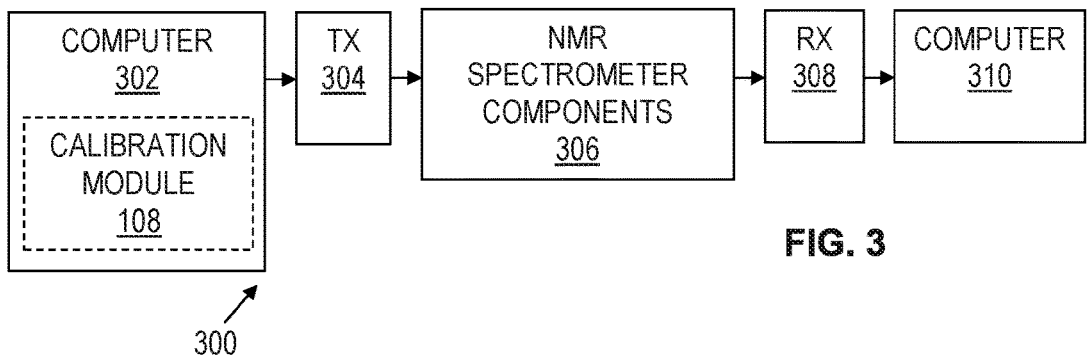
FIG. 3 shows a block diagram of an illustrative NMR logging system.

FIG. 3 shows a block diagram of an illustrative NMR logging system 300. The NMR logging system 300 includes a computer 302 that stores and executes the calibration module 108. The calibration module 108 performs calibration operations using a reduced search space as described herein. The computer 302 is configured to provide commands, programming, and/or data to a transmitter 304. The transmitter 304 may include a pulse programmer, a radio frequency (RF) synthesizer, a phase shifter, a pulse gate, an amplifier, and/or other components to control the pulsed magnetic field for NMR logging operations, including the calibration operations described herein. In accordance with some embodiments, the computer 302 and transmitter 304 of NMR logging system 300 may perform the operations described for the controller 106 and pulsed magnetic field source 104 of NMR logging tool 100 (see FIG. 1).

The NMR logging system 300 also includes NMR spectrometer components 306 used for NMR logging operations. Examples of NMR spectrometer components 306 include one or more magnets, shim coils, probes/antennas, and/or field-frequency lock components. Further, the NMR spectrometer components 306 may include a duplexer that enables separation between transmission current and reception current. The receiver 308 of NMR logging system 300 is configured to receive and decode NMR signals. The receiver 308 may include an analog-to-digital converter (ADC), filters, mixers, splitters, pre-amplifiers, and/or other components to receive NMR signals and recover measurement data. The recovered measurement data is output from the receiver 308 to a computer 310 for storage and analysis. The computers 302 and 310 illustrated for the NMR logging system 300 may be the same computer or may be different computers.

Figure 4:
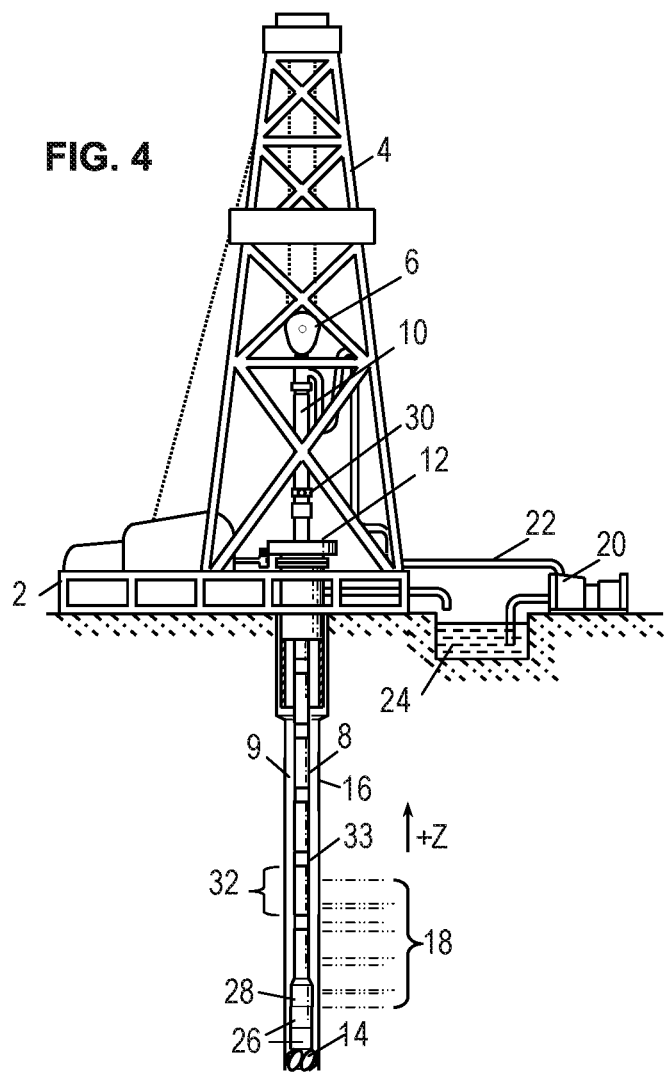
FIG. 4 shows an illustrative logging while drilling (LWD) environment.

The operation of the disclosed NMR logging system and method embodiments is best understood in context. Accordingly, FIG. 4 shows an illustrative logging while drilling (LWD) environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole. Depending on the job requirements, the drilling fluid may be oil-based (with a high resistivity) or water-based (with a low resistivity).

The drill bit 14 is just one piece of an open-hole LWD assembly that includes one or more drill collars 26 and logging tools 28, 32. Drill collars 26 are thick-walled steel pipe sections that provide weight and rigidity for the drilling process. The logging tools 28, 32 (some of which may be built in to the drill collars) gather measurements of various drilling or formation parameters. As an example, logging instrument 28 may be integrated into the bottom-hole assembly near the bit 14 to collect pulsed neutron tool density measurements, acoustic wave propagation measurements, or gamma ray intensity measurements. Meanwhile, logging tool 32 may be coupled to other modules of drill string 8 by one or more adaptors 33. In accordance with some embodiments, either of logging tools 28, 32 may include an NMR logging tool configured to perform and/or be directed by the calibration techniques described herein.

Measurements from the logging tools 28, 32 can be acquired by a telemetry sub (e.g., built in to logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

At various times during the drilling process, the drill string 8 shown in FIG. 4 may be removed from the borehole 16. Once the drill string 8 has been removed, as shown in FIG. 5, logging operations can be conducted using a wireline logging string 34 (i.e., an assembly of wireline logging tools suspended by a cable 42 having conductors for transporting power to the tools and telemetry from the tools to the surface). It should be noted that various types of formation property sensors can be included with the wireline logging sonde 34. For example, the illustrative wireline logging sonde 34 includes logging tool 32, which may correspond to an NMR logging tool configured to perform and/or be directed by the calibration techniques described herein. The logging tool 32 may be coupled to other modules of wireline logging sonde 34 by one or more adaptors 33.

A wireline logging facility 44 collects measurements from the logging tool 32, and includes computing facilities 45 for managing logging operations, acquiring and storing the measurements gathered by the wireline logging sonde 34, and optionally processing the measurements for display to a user. For the logging environments of FIGS. 4 and 5, measured parameters can be recorded and displayed in the form of a log, i.e., a two-dimensional graph showing the measured parameter as a function of tool position or depth.

FIG. 6 shows an illustrative computer system 43 for managing logging operations. The computer system 43 may correspond to, e.g., an onsite logging facility for the drilling rig of FIG. 4, the computing facilities 45 of the wireline logging facility 44 of FIG. 5, or a remote computing system that receives logging measurements from such logging facilities. The computer system 43 may include wired or wireless communication interfaces receiving such logging measurements. As shown, the illustrative computer system 43 comprises user workstation 51 with a computer chassis 46 coupled to a display device 48 and a user input device 50. The computer chassis 46 includes one or more information storage devices for accessing software (shown in FIG. 6 in the form of removable, non-transitory information storage media 52) that configures the computer system to interact with a user, enabling the user to process the logging data and, in the case of local logging facilities, to manage logging operations including analyzing borehole conditions. The software may also be downloadable software accessed through a network (e.g., via the Internet). In some embodiments, illustrative computer system 43 executes software that performs the calibration operations described herein and directs logging operations of a NMR logging tool (e.g., NMR logging tool 100 or 32) using the calibration.

Figure 7:
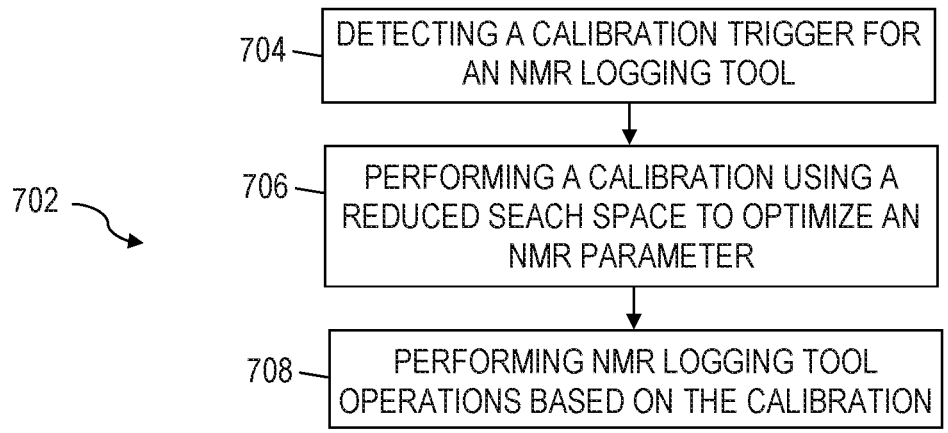
FIG. 7 is a flowchart for an illustrative logging method.

FIG. 7 is a flowchart for an illustrative logging method 702. In method 702, a calibration trigger for an NMR logging tool is detected (block 704). As an example, the calibration trigger may correspond to a manual trigger, a schedule-based trigger, and/or an environmental trigger (e.g., a temperature-based trigger). In response to the calibration trigger, a pulsed magnetic field source calibration using a reduced search space is performed as described herein to optimize an NMR parameter (block 706). NMR logging tool operations are then performed based on the calibration (block 708).

Figure 8:
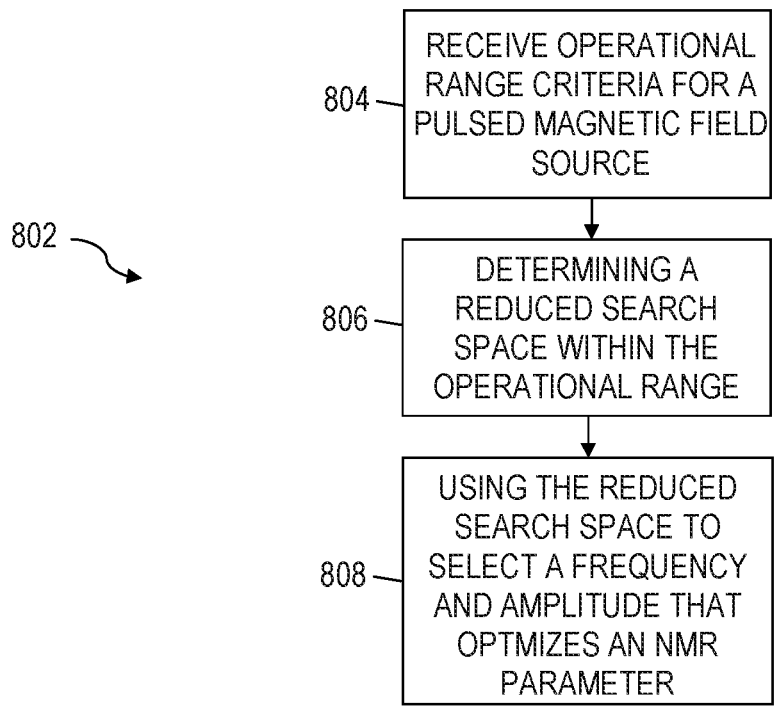
FIG. 8 is a flowchart for an illustrative calibration method.

FIG. 8 is a flowchart for an illustrative calibration method 802. At block 804, operational range criteria for a pulsed magnetic field source are received. The operational range criteria may correspond to a frequency range and an amplitude range as described herein. At block 806, a reduced search space within the operational range is determined. At block 808, the reduced search space is used to select a frequency and an amplitude that optimize an NMR parameter.

In some embodiments, the reduced search space can be estimated as a linear equation, nonlinear equation, or symmetric shape equation within the operational range. Such equations may be estimated based on a predetermined understanding of how the optimal amplitude and frequency relate to sampled data points within the operational range. Once the reduced search space has been derived, scanning is performed at multiple data points within or along the reduced search space (visualized as scanning along a line corresponding to the reduced search space) to determine an optimal frequency and amplitude for the pulsed magnetic field source. In alternative embodiments, statistical algorithms are employed to determine the reduced search space and/or to select an optimal frequency and amplitude within (or along) the reduced search space. The statistical algorithms may be used alone or in combination with other reduced search space techniques. For example, the statistical algorithms may be employed to reduce the number of data points needed to determine the reduced search space and/or to reduce the number of data points that are scanned within or along the reduced search space.

Numerous other variations and modifications will become apparent to those skilled in the art once the above disclosure is fully appreciated. It is intended that the following claims be interpreted to embrace all such variations and modifications where applicable.

What is claimed is:

1. A nuclear magnetic resonance (NMR) logging tool, comprising:
   a static magnetic field source;
   a pulsed magnetic field source with an operational range corresponding to a first range for a first attribute and a second range for a second attribute;
   logging instrumentation configured to measure NMR responses corresponding to a plurality of values of the first attribute for each of two values of the second attribute within the second range; and
   a controller communicatively coupled with the pulsed magnetic field source, wherein the controller is configured to,
      determine, among the plurality of first attribute values, a first attribute value at which an optimized NMR response is measured for a first of the two values of the second attribute;
      determine, among the plurality of first attribute values, a first attribute value at which an optimized NMR response is measured for a second of the two values of the second attribute;
      determine a range of first and second attribute value pairs based on the two values of the second attribute and the determined first attribute values at which optimized NMR responses are measured for the two values of the second attribute; and
      select, based on measured NMR responses corresponding to a plurality of the first and second attribute value pairs, an operating point within the range of first and second attribute value pairs that optimizes an NMR response.

2. The NMR logging tool of claim 1, wherein said determining the range of first and second attribute value pairs comprises:
   identifying first and second dual parameter points in the operational range, wherein the first dual parameter point comprises the first of the two second attribute values and the first attribute value at which the NMR response is optimized for the first of the two second attribute values, and wherein the second dual parameter point comprises the second of the two second attribute values and the first attribute value at which the NMR response is optimized for the second of the two second attribute values; and
   deriving a linear equation corresponding to a line that extends through the first and second dual parameter points to form the range of first and second attribute value pairs.

3. The NMR logging tool of claim 2, wherein the controller is configured to identify the first and second dual parameter points by performing amplitude scan operations at two different frequencies within the operational range, and identifying a scanned amplitude that optimizes a signal-to-noise ratio (SNR) or a signal amplitude NMR parameter for each of the two different frequencies.

4. The NMR logging tool of claim 2, wherein the controller is configured to identify the first and second dual parameter points by performing frequency scan operations at two different amplitudes within the operational range, and identifying a scanned frequency that optimizes a signal-to-noise ratio (SNR) or a signal amplitude NMR parameter for each of the two different amplitudes.

5. The NMR logging tool of claim 1, wherein the range of first and second attribute value pairs is identified using a statistical scan algorithm.

6. The NMR logging tool of claim 1, wherein the controller comprises a processor and a memory storing a calibration program, and wherein the processor executes the calibration program to determine the range of first and second attribute value pairs.

7. The NMR logging tool of claim 1, wherein the controller comprises a control interface to receive calibration commands from a remote computer and to execute a calibration program, and wherein the remote computer determines the range of first and second attribute value pairs.

8. The NMR logging tool of claim 1, wherein the operating point is determined using the measured NMR responses corresponding to the first and second attribute value pairs and the NMR responses from the plurality of values of the first attribute for each of two or more values of the second attribute by a statistical method.

9. The NMR logging tool of claim 1, wherein determining first attribute values at which optimized NMR responses are measured for the two second attribute values and determining the range of first and second attribute value pairs are implemented during calibration of the pulsed magnetic field source, and wherein the controller is configured to perform the calibration while the NMR logging tool is in a downhole environment in response to a temperature change criterion.

10. A method, comprising:
performing a calibration for an nuclear magnetic resonance (NMR) logging tool that includes a pulsed magnetic field source with an operational range corresponding to a first range for a first attribute and a second range for a second attribute including,
measuring NMR responses corresponding to a plurality of values of the first attribute for each of two values of the second attribute within the second range;
determining, among the plurality of first attribute values, a first attribute value at which an optimized NMR response is measured for a first of the two values of the second attribute;
determining, among the plurality of first attribute values, a first attribute value at which an optimized NMR response is measured for a second of the two values of the second attribute;
determining a range of first and second attribute value pairs based on the two values of the second attribute and the determined first attribute values at which optimized NMR responses are measured for the two values of the second attribute; and
selecting, based on measured NMR responses corresponding to a plurality of the first and second attribute value pairs, an operating point within the range of first and second attribute value pairs that optimizes an NMR response.

11. The method of claim 10, wherein determining the range of first and second attribute value pairs comprises estimating a linear trajectory within the operational range that includes a frequency and an amplitude that optimize the NMR response.

12. The method of claim 10, wherein determining the range of first and second attribute value pairs comprises estimating a nonlinear trajectory within the operational range that includes a frequency and an amplitude that optimize the NMR response.

13. The method of claim 11, wherein determining the range of first and second attribute value pairs comprises estimating an area within the operational range that includes a frequency and an amplitude that optimize the NMR response.

14. The method of claim 10, wherein determining the range of first and second attribute value pairs comprises applying a statistical scan algorithm.

15. The method of claim 10, wherein determining first attribute values at which optimized NMR responses are measured for the two second attribute values and determining the range of first and second attribute value pairs are implemented during calibration of a pulsed magnetic field source within the NMR logging tool, said method further comprising performing said calibration before the NMR logging tool is lowered into a downhole environment.

16. The method of claim 10, wherein determining first attribute values at which optimized NMR responses are measured for the two second attribute values and determining the range of first and second attribute value pairs are implemented during calibration of a pulsed magnetic field source within the NMR logging tool, said method further comprising performing said calibration while the NMR logging tool is in a downhole environment.

17. The method of claim 10, wherein determining first attribute values at which optimized NMR responses are measured for the two second attribute values and determining the range of first and second attribute value pairs are implemented during calibration of a pulsed magnetic field source within the NMR logging tool, said method further comprising performing said calibration after the NMR logging tool is removed from a downhole environment.

18. The method of claim 10, wherein determining first attribute values at which optimized NMR responses are measured for the two second attribute values and determining the range of first and second attribute value pairs are implemented during calibration of a pulsed magnetic field source within the NMR logging tool, said method further comprising performing said calibration in response to a temperature change criterion.

19. A nuclear magnetic resonance (NMR) logging system comprising:
a pulsed magnetic field source with an operational range corresponding to a first range for a first attribute and a second range for a second attribute;
logging instrumentation configured to measure NMR responses corresponding to a plurality of values of the first attribute for each of two values of the second attribute within the second range; and
a non-transitory computer readable medium storing a calibration program that, when executed, causes a processor to:
determine, among the plurality of first attribute values, a first attribute value at which an optimized NMR response is measured for a first of the two values of the second attribute;

determine, among the plurality of first attribute values, a first attribute value at which an optimized NMR response is measured for a second of the two values of the second attribute;

determine a range of first and second attribute value pairs based on the two values of the second attribute and the determined first attribute values at which optimized NMR responses are measured for the two values of the second attribute; and select, based on measured NMR responses corresponding to a plurality of the first and second attribute value pairs, an operating point within the range of first and second attribute value pairs that optimizes an NMR response.

20. The non-transitory computer readable medium of claim 19, wherein the calibration program, when executed, causes the processor to determine the range of first and second attribute value pairs by identifying two points in the operational range that optimize an NMR signal-to-noise ratio (SNR) or a signal amplitude NMR parameter, and by deriving a linear equation based on the two points.

* * * * *